US009054858B2

(12) United States Patent
Dawid et al.

(10) Patent No.: US 9,054,858 B2
(45) Date of Patent: Jun. 9, 2015

(54) TRANSMISSION AND DETECTION IN MULTIPLE-ANTENNA TRANSMISSION SYSTEMS

(75) Inventors: Herbert Dawid, Herzogenrath (DE); Markus Jordan, Gelsenkirchen (DE); Edgar Bolinth, Korschenbroich (DE); Thorsten Clevorn, Munich (DE)

(73) Assignee: Intel Mobile Communications GmbH, Neubiberg (DE)

( * ) Notice: Subject to any disclaimer, the term of this patent is extended or adjusted under 35 U.S.C. 154(b) by 61 days.

(21) Appl. No.: 13/474,775

(22) Filed: May 18, 2012

(65) Prior Publication Data

US 2013/0308686 A1 Nov. 21, 2013

(51) Int. Cl.
*H04B 1/00* (2006.01)
*H04L 1/06* (2006.01)
*H04B 7/02* (2006.01)
*H04B 7/04* (2006.01)
*H04B 7/06* (2006.01)
*H04L 25/03* (2006.01)
*H04W 52/56* (2009.01)
*H04L 1/00* (2006.01)
*H04W 52/14* (2009.01)
*H04W 52/42* (2009.01)

(52) U.S. Cl.
CPC ............... *H04L 1/0625* (2013.01); *H04B 7/02* (2013.01); *H04B 7/0452* (2013.01); *H04B 7/0413* (2013.01); *H04B 7/0678* (2013.01); *H04L 1/0668* (2013.01); *H04L 2025/03414* (2013.01); *H04B 7/0404* (2013.01); *H04W 52/56* (2013.01); *H04L 1/0057* (2013.01); *H04W 52/146* (2013.01); *H04L 1/0072* (2013.01); *H04W 52/42* (2013.01); *H04B 7/0669* (2013.01)

(58) Field of Classification Search
CPC ....... H04L 1/06; H04L 5/0023; H04L 1/0625; H04L 2025/03414; H04L 27/2601; H04L 1/0057; H04L 1/0606; H04L 1/0668; H04L 5/023; H04L 1/0041; H04L 1/0643; H04L 27/2626; H04L 5/0016; H04W 52/42; H04W 88/08; H04W 52/325; H04W 52/54; H04W 72/04; H04W 72/02; H04B 7/0452; H04B 7/0413; H04B 1/707; H04B 1/709; H04B 17/00; H04B 7/02; H04B 7/068; H04B 7/06; H04B 7/04
USPC ............ 375/146, 267, 299, 295, 141, E1.002, 375/E1.02, 260, 147; 455/101, 103, 522, 455/500, 102; 370/431
See application file for complete search history.

(56) References Cited

U.S. PATENT DOCUMENTS

| | | | |
|---|---|---|---|
| 6,775,329 B2 * | 8/2004 | Alamouti et al. | 375/267 |
| 7,433,339 B2 * | 10/2008 | Kaipainen et al. | 370/335 |
| 7,564,915 B2 * | 7/2009 | Lee et al. | 375/267 |

(Continued)

OTHER PUBLICATIONS

Alcatel-Lucent "transmit diversity solutions for F-DPCH; Aug. 24-29, 2009".*
Alcatel-Lucent transmit diversity solutions for F-DPCH; Aug. 24-29, 2009.*
MIMO in HSPA: the Real-World Impact, p. 1-18.

(Continued)

*Primary Examiner* — Rahel Guarino
(74) *Attorney, Agent, or Firm* — Eschweiler & Assocaites, LLC (57) ABSTRACT

An apparatus includes a transmit diversity encoder configured to use a block code of a length greater than one for encoding at least two consecutive symbols. A first symbol of the at least two consecutive symbols is dedicated to a first user and the second symbol of the at least two consecutive symbols is dedicated to a second user.

14 Claims, 7 Drawing Sheets

(56) References Cited

U.S. PATENT DOCUMENTS

| | | | |
|---|---|---|---|
| 8,259,776 B2* | 9/2012 | Lee et al. | 375/135 |
| 8,355,424 B2* | 1/2013 | Xi et al. | 375/144 |
| 8,379,604 B2* | 2/2013 | Wolf et al. | 370/334 |
| 8,503,566 B2* | 8/2013 | Javaudin | 375/267 |
| 8,509,291 B2* | 8/2013 | Seong et al. | 375/220 |
| 8,599,803 B1* | 12/2013 | Zhang et al. | 370/338 |
| 2005/0259757 A1* | 11/2005 | Wu et al. | 375/260 |
| 2006/0274708 A1* | 12/2006 | Estraviz et al. | 370/342 |
| 2007/0010196 A1* | 1/2007 | Periyalwar et al. | 455/7 |
| 2009/0003466 A1* | 1/2009 | Taherzadehboroujeni et al. | 375/260 |
| 2013/0129010 A1* | 5/2013 | Xi et al. | 375/295 |

OTHER PUBLICATIONS

3GPP TSG RAN WGI Meeting #57bis—Tdoc RI-092615, "Transmit Diversity for F-DPCH", Los Angeles, USA, Jun. 29-Jul. 3, 2009, p. 1-2.

3GPP TSG RAN WGI Meeting #58—Tdoc RI-093337, "Transmit Diversity Solutions for F-DPCH", Shenzhen, China, Aug. 24-28, 2009, p. 1-3.

3GPP TSG RAN WGI #S7bis—RI-092871, "Link Analysis of non-TxD Type 2/3 Receivers in 2 Transmit Antenna Environment", Jun. 29-Jul. 3, 2009, Los Angeles, USA, p. 1-6.

Pavan Kumar Vitthaladevuni, et al., "CSoHS Voice Capacity in HSPA networks with realistiC overhead channel modeling" Member, IEEE, 2011, p. 1-6.

* cited by examiner

- a - F - DPCH TxDiv acc. to 3GPP, fully loaded TxDiv Cell
- b - F - DPCH no TxDiv acc. to 3GPP, fully loaded non-TxDiv Cell
- c - Approach1: FDPCH STTD SF256 (2 TpcBits), fully loaded TxDiv Cell
- d - Approach2: FDPCH STTD SF128 (4 TpcBits), fully loaded TxDiv Cell

TRANSMISSION AND DETECTION IN MULTIPLE-ANTENNA TRANSMISSION SYSTEMS

FIELD

The invention relates to the field of radio communications, and more particularly to the technique of transmitting and detecting signals in multiple-antenna transmission systems of radio networks, in particular cellular radio networks.

BACKGROUND

Multiple-antenna transmission systems are widely used to improve the radio communications system capacity and to ensure high guaranteed bit rates across large coverage areas. Different transmit diversity (TxDiv) schemes have been established and stipulated in various standards, among them STTD (Space Time Transmit Diversity) or Space Time Block Coding, TSTD (Time Switched Transmit Diversity), CLTD (Closed Loop Transmit Diversity), SFBC (Space Frequency Block Coding), etc. Recently, MIMO (Multiple Input Multiple Output) has been established in various standards, among them the LTE (Long Term Evolution) standard and in HSPA (High Speed Packet Access). MIMO uses multiple transmit antennas available at the radio base station and multiple receive antennas available at the terminal device.

BRIEF DESCRIPTION OF THE DRAWINGS

Aspects of the invention are made more evident by way of example in the following detailed description of embodiments when read in conjunction with the attached drawing figures, wherein.

DETAILED DESCRIPTION

In the following detailed description, reference is made to the accompanying drawings, which form a part thereof, and in which is shown by way of illustration embodiments in which the invention may be practiced. It is to be understood that other embodiments may be utilized and structural or logical changes may be made without departing from the scope of the present disclosure. The following detailed description, therefore, is not to be taken in a limiting sense, and the scope of the present invention is defined by the appended claims.

It is to be understood that the features of the various exemplary embodiments described herein may be combined with each other, unless specifically noted otherwise. Further, like reference numerals designate corresponding similar parts.

As employed in this specification, the terms "coupled" and/or "connected" are not meant to mean in general that the elements must be directly coupled or connected together; intervening elements may be provided between the "coupled" or "connected" elements. However, although not restricted to that meaning, the terms "coupled" and/or "connected" may also be understood to optionally disclose an implementation in which the elements are directly coupled or connected together without intervening elements provided between the "coupled" or "connected" elements.

It should be understood that embodiments may be implemented in discrete circuits, partially integrated circuits or fully integrated circuits. Further, embodiments of the invention may be implemented on a single semiconductor chip or on multiple semiconductor chips connected to each other.

Furthermore, it should be understood that embodiments of the invention may be implemented in software or in dedicated hardware or partially in software and partially in dedicated hardware.

The following description relates to a radio transmitter apparatus and radio receiver apparatus, in particular to radio transmitter apparatus and radio receiver apparatus operating in a radio network of a radio communications system, e.g. in a cellular radio network. By way of example, the radio communications system may be a CDMA (Code Division Multiple Access) system, e.g. a cellular radio communications system such as, e.g., UMTS (Universal Mobile Telecommunications System) including developments such as, e.g., HSPA (High Speed Packet Access). By way of example, the cellular radio communications system may be a WCDMA (Wideband CDMA) system defined by the 3GPP ($3^{rd}$ Generation Partnership Project), e.g. as stipulated in particular in 3GPP Technical Specification 25.211, Version V7.10.0. Further, the radio communications system may be a multi-carrier modulation system such as, e.g., an OFDM (Orthogonal Frequency Division Multiplexing) radio communications system, including cellular radio systems as stipulated in the LTE (Long Term Evolution) standard.

Radio receiver apparatus as described herein may form a part of a mobile station of a radio (or wireless) network. In the following the terms "mobile station" and "UE" (User Equipment) shall have the same meaning, which meaning shall comprise the definitions given in the various standards (e.g. UMTS, LTE and derivatives thereof). By way of example, a UE may be represented by a cellular phone, a smartphone, a tablet PC, a laptop, etc. Further, in the following the terms "base station" and "NodeB" shall have the same meaning, which meaning shall comprise the definitions given in the various standards (e.g. UMTS, LTE and derivatives thereof).

Transmit diversity, also referred to as TxDiv in the art, is applied in many radio communications systems such as, e.g., the radio communications systems recited above. Transmit diversity may e.g. be used on downlink physical channels allocated to an UE. Transmit diversity uses multiple-antenna transmission systems. By way of example, STBCs (Space Time Block Codes) or SFBCs (Space Frequency Block Codes) are used to transmit multiple copies of a data stream across a number of transmit antennas to exploit the redundancy of the various received versions of the data to improve the reliability of data transfer.

UEs may be provided with more than one receive antenna in order to use MIMO (Multiple Input Multiple Output) schemes. MIMO involves multiple transmit and multiple receive antennas available at the radio base station and the UE to increase data rates and overall capacity. A MIMO system uses the antennas at both transmitter and receiver to create multiple uncorrelated radio links (often referred to as "streams") between the transmitter and receiver. These streams may use the same time and frequency recourses, enabling capacity to be increased e.g. without an increase in spectrum.

Figure 1:
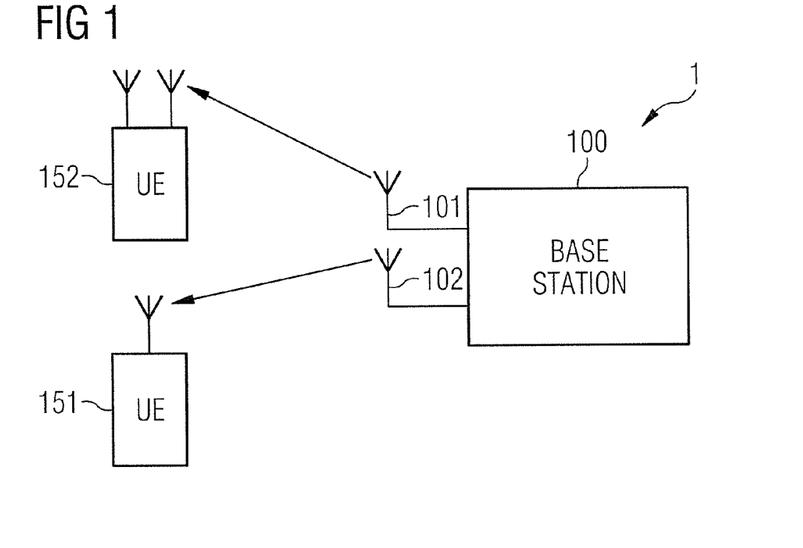
FIG. 1 is a diagram illustrating a radio network system in accordance with the disclosure.

In FIG. 1 an exemplary radio network system 1 is shown, e.g. one of the above-mentioned systems. The radio network system 1 may be a cellular radio network system 1. The radio network system 1 may include a base station 100, sometimes referred to as NodeB, and a plurality of user terminals 151, 152, which are referred to as UEs 151, 152 in the following.

Typically, different users may be associated with different UEs 151, 152. UEs 151, 152 of different users may be located remote from each other, e.g. near a center and at a border of a cell. That is, different transmit powers may be used by a transmitter apparatus located in a base station 100 to serve the different users.

The base station 100 may comprise two or more antennas 101, 102 for radio communication with the UEs 151, 152. One or more or all of the UEs, e.g. UE 151, may have one receive antenna (non-MIMO UE). One or more or all of the UEs, e.g. UE 152, may have two or more receive antennas (MIMO UE).

The radio network system 1 uses a transmit diversity scheme in the downlink. The radio network system 1 may optionally use MIMO. There may e.g. be a co-existence between MIMO UEs such as, e.g., UE 152, and non-MIMO UEs such as, e.g., UE 151.

Figure 2:
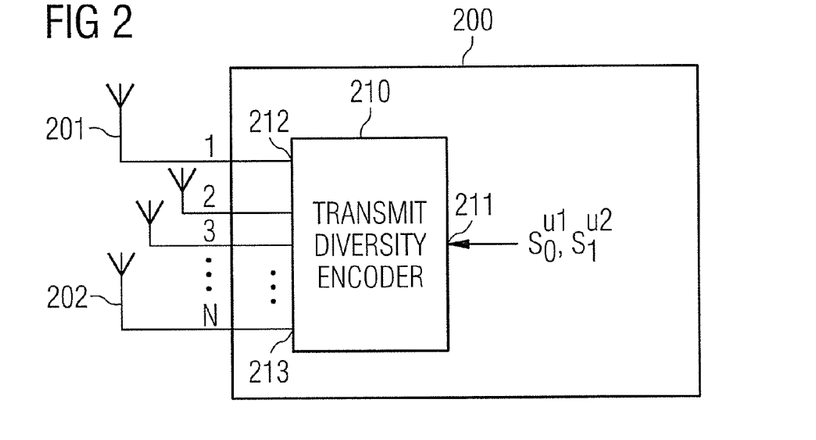
FIG. 2 is block diagram illustrating an exemplary implementation of a radio transmitter apparatus in accordance with the disclosure.

As shown in FIG. 2, a transmitter 200 may include a transmit diversity encoder 210. The transmit diversity encoder 210 has an input 211 and a number N of outputs 212, 213, wherein N is an integer equal or greater than 2. Each output 212, 213 may be coupled to a respective transmit antenna 201, 202. Without loss of generality, in the following, N=2 is considered for the sake of simplicity.

The transmitter 200 may be part of the base station 100 of the radio network system 1. In this case, transmit antenna 201, 202 may correspond to transmit antennas 101, 102 of FIG. 1. It is also possible that the transmitter forms part of an UE 151, 152 of the radio network system 1, if uplink transmit diversity is considered.

Input 211 receives a series of modulated symbols $s_0^{U0}$, $s_1^{U1}$, . . . to be transmitted over the plurality of antennas 201, 202. A block code such as e.g. a STBC or a SFBC is used to encode the series of symbols $s_0^{U0}$, $s_1^{U1}$, . . . in blocks, which are distributed among the spaced antennas 201, 202 and time or frequency, respectively. The lowercase indices of the modulated symbols $s_0^{U0}$, $s_1^{U1}$, . . . refer to the symbol time (STBC) or symbol frequency (SFBC), whereas the uppercase indices of the modulated symbols $s_0^{U0}$, $s_1^{U1}$, . . . refer to an user (e.g. UE), to which the symbol is dedicated. As illustrated in FIG. 2, the first symbol $s_0^{U0}$ of the at least two consecutive symbols is dedicated to a first user U0, e.g. UE 151, and the second symbol $s_1^{U1}$ of the at least two consecutive symbols is dedicated to a second user U1, e.g. UE 152. By way of example, the symbols $s_0^{U0}$, $s_1^{U1}$ may be TPC (Transmit Power Control) symbols.

In the following, by way of example and without loss of generality, a block code of length L=2 is considered. In a block code of length 2, two symbols consecutive in time are encoded to form a codeword (generally, L consecutive symbols are encoded to form a codeword of dimension N). Further in the following, without loss of generality, STBCs are considered. As SFBCs and STBCs may be identical codes, the disclosure herein equally applies to SFBCs and STBCs. By way of example, the STBC (including SFBCs) considered herein are Alamouti's codes.

Figure 3:
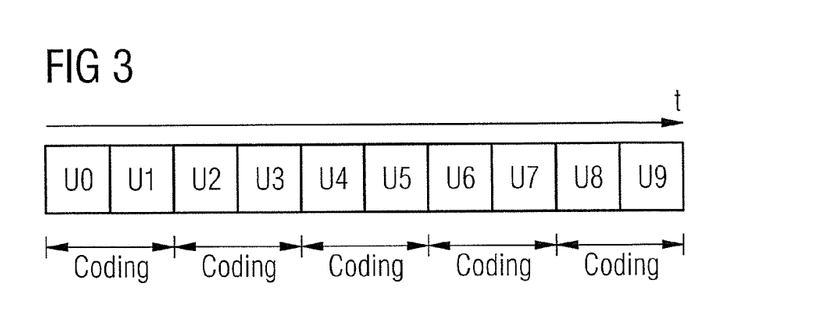
FIG. 3 is a diagram illustrating transmit diversity coding of a series of symbols dedicated to different users in accordance with the disclosure.

FIG. 3 illustrates the coding process applied in the transmit diversity encoder 210. Space time block coding (of exemplary length 2) is repeatedly performed over pairs of symbols, i.e. each block of FIG. 3 corresponds to a symbol, and the arrow corresponds to time t. The first pair of symbols is attributed to user 0 and user 1 referred to as [U0,U1]. The second pair of symbols to be encoded is assigned to user 2 and user 3 referred to as [U2,U3]. Analogously, space time block coding is performed on pairs of symbols attributed to user 4 and user 5, i.e. [U4,U5], user 6 and user 7, i.e. [U6,U7] and user 8 and user 9, i.e. [U8,U9], respectively. The symbols indicated by the blocks of FIG. 3 may be the modulated symbols $s_0^{U0}$, $s_1^{U1}$, . . . as depicted in FIG. 2. By way of example, the symbols may be TPC symbols.

Since space time block coding is performed on pairs of adjacent symbols, a condition that the transmission channel should be constant over the total duration of one encoded space time block, namely the code length L of e.g. two symbol periods, may be approximately fulfilled.

In accordance with one example, the users U0, U1, . . . , U9 associated with a series of consecutive symbols of a specific time interval, which will be denoted as a time slot in the following, are different, i.e. U0≠U1≠ . . . ≠U9.

In accordance with one example, the users associated with each one pair of symbols within the time slot may be different, i.e. U0≠U1, U2≠U3, U4≠U5, . . . , U8≠U9. However, different pairs of symbols may comprise symbols associated with the same user, e.g. U0=U2, etc.

In accordance with one example, (only) at least one pair of encoded symbols may comprise symbols associated with different users, e.g. U0≠U1. However, by way of example, U4=U5.

In accordance with one example, unused symbols may be left "empty". E.g. regarding the pair of symbols associated with user pair [U2,U3], no symbol may be transmitted at the symbol time allocated to user U3. Empty symbols within a pair of symbols to be block coded may e.g. be experienced during a DTx (Discontinuous Transmission) mode. However, at least one pair of symbols to be block coded, e.g. [U0,U1], comprises two symbols (i.e. is filled) associated with different U0≠U1.

Generally, L-tuples of consecutive symbols are encoded by a STBC of length L to form a codeword, wherein L is an integer equal or greater than 2. In this case, analogous considerations as outlined above for the example of L=2 apply for L-tuples of consecutive symbols on which space time block coding with a block code of length L is performed.

Space time block coding using STBCs is used for transmit diversity in 3GPP UMTS as "Space Time Transmit Diversity" (STTD) and in 3GPP LTE for space frequency block coding. Concepts, principles and details in accordance with the disclosure are described and illustrated herein by way of example with reference to STTD as used in 3GPP UMTS. STTD is an Alamouti's STBC of L=2. However, the disclosure herein, even though partly exemplified by STTDs for the sake of simplicity, generally applies to STBCs (including SFBCs) used for transmit diversity coding in radio or wireless network system for transmit diversity coding.

Figure 4:
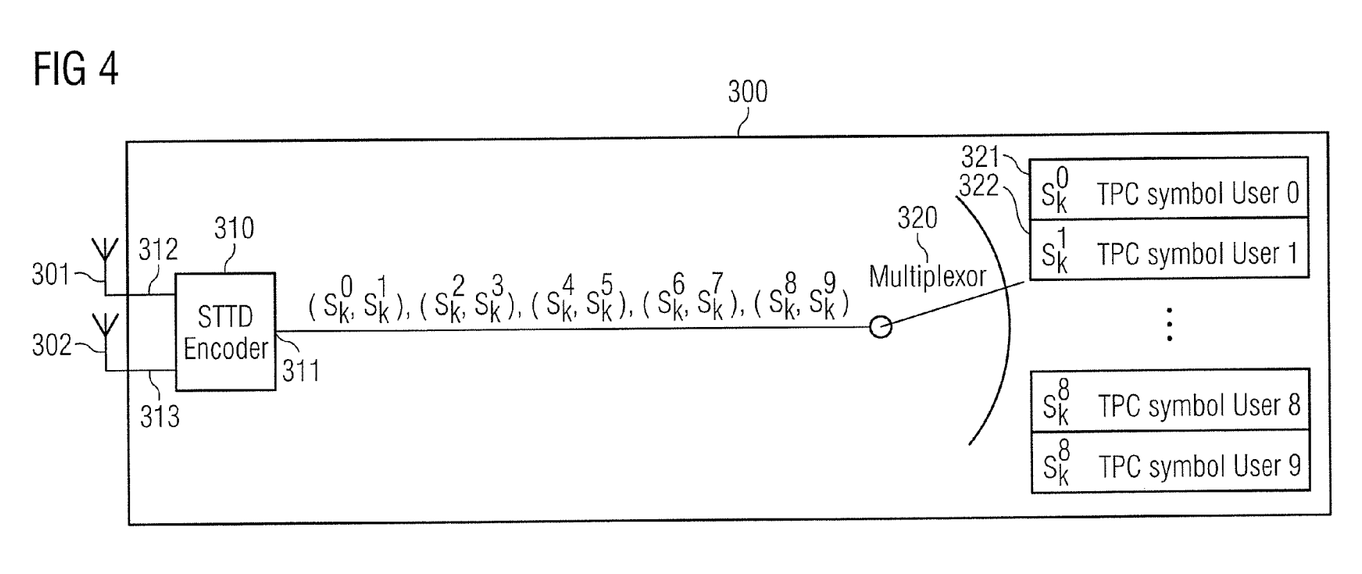
FIG. 4 is a block diagram illustrating an exemplary implementation of a radio transmitter apparatus in accordance with the disclosure.

As shown in FIG. 4, according to a first approach to transmit F-DPCH symbols with TxDiv, a transmitter 300 of a radio network system may include a STTD encoder 310 having an input 311 and two outputs 312, 313. The outputs 312, 313 are coupled to transmit antennas 301, 302. Further, the transmitter 300 may include a combiner (or multiplexor) 320, a F-DPCH (Fractional-Dedicated Physical CHannel) symbol generator 321 and a F-DPCH symbol generator 322. The F-DPCH symbol generator 321 generates modulated F-DPCH symbols (referred to as TPC symbols) dedicated to user 0 (U0). The F-DPCH symbol generator 322 generates modulated F-DPCH symbols (referred to as TPC symbols) dedicated to user 1 (U1). As will be explained in more detail further below, the combiner (or multiplexor) 320 may combine one symbol from F-DPCH symbol generator 321 and one symbol from F-DPCH symbol generator 322 to a pair of symbols and passes this pair of symbols to the input 311 of the STTD encoder 310. As indicated in FIG. 4, further F-DPCH symbol generators may be provided to generate TPC symbols combine pairs of TPC symbols dedicated to users U3-U9, wherein the combiner (or multiplexor) 320 is configured to combine TPC symbol pairs associated with [U2,U3], [U4, U5], [U6,U7], and [U8,U9]. Parts of the transmitter 300 of FIG. 4 may correspond to parts of the transmitter 200 of FIG. 2 having reference numerals of identical two last digits, and therefore, reference is made to the above description for the sake of brevity.

The STTD encoder 310 applies a 2×2 Alamouti's block code to each pair of symbols received at input 311. STTD encoding in downlink transmit diversity for 3GPP UMTS is stipulated e.g. in 3GPP TS 25.211 Version 7.10.0, Release 7, Sections 5.3.1 "Downlink transmit diversity", 5.3.1.1 "Open loop transmit diversity", and, in particular 5.3.1.1.1 "Space time block coding based transmit antenna diversity (STTD)", the contents of these Sections are incorporated herein by way of reference.

Figure 5:
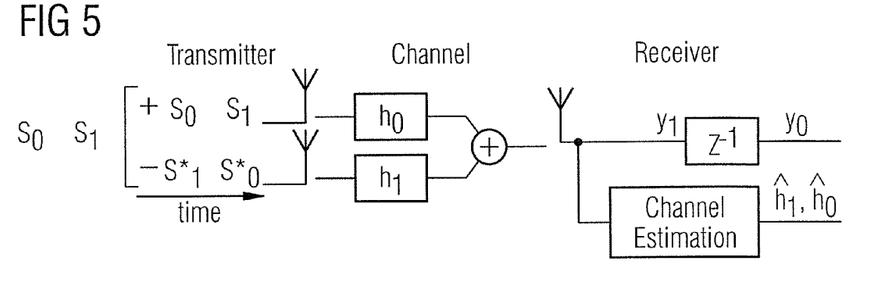
FIG. 5 is a block diagram of a system model of STTD encoding and decoding in accordance with the disclosure.

FIG. 5 illustrates a system model of STTD encoding and decoding. Two successive modulated (e.g. QPSK (Quadrature Phase Shift Keying) modulated) symbols $s_0$ and $s_1$ are encoded as described above to obtain a first symbol pair $s_0, s_1$ of a symbol stream transmitted via the first transmit antenna (e.g. transmit antenna 301 of FIG. 4) and to obtain a second symbol pair $-s^*_1, s^*_0$ of a second symbol stream transmitted via the second transmit antenna (e.g. transmit antenna 302 of FIG. 4). Here, a "*" denotes the complex conjugate.

As known in the art but not shown in FIG. 5 for the sake of simplicity, the STTD encoded symbols of each symbol stream may be up-sampled by a spreading factor SF, so that one symbol will then consist of SF chips. All up-sampled symbols may be spread (i.e. convolved) with a spreading code, e.g. an OVSF (Orthogonal Variable Spreading Factor) code. The spread symbols are then possibly scrambled, combined and modulated before being transmitted via antennas 312, 313. It is to be noted that the order of such processing may be subject to variations, e.g. it may be possible to first spread and/or scramble symbols and then to apply STTD encoding.

The symbol streams are propagated through a plurality of e.g. two channels to a receive antenna of a receiver. Without loss of generality, two one tap channels are considered for sake of simplicity. The channels are characterized by their complex-valued channel impulse response $h_0$, $h_1$, respectively.

The receiver receives symbols $y_0$ and $y_1$. In FIG. 5, the block $z^{-1}$ relates to a one symbol delay, i.e. $y_0$ is received one symbol period in advance of $y_1$. The receiver may perform channel estimation to derive estimated channel impulse responses $\hat{h}_0$, $\hat{h}_1$ e.g. on the basis of received symbols. As known in the art but not depicted in FIG. 5 for the sake of simplicity, the sampled values received from the receive antenna may be despread, descrambled, integrated to symbols and combined over several paths (e.g. maximum ratio combining) to obtain received symbols $y_0$, $y_1$. The receiver may be every kind of receiver, e.g. a Rake receiver.

The received symbols $y_0$, $y_1$ are given by $$y_0 = h_0 s_0 - h_1 s^*_1 + n_0 \qquad (1)$$

$$y_1 = h_0 s_1 - h_1 s^*_0 + n_1,$$

with $n_0$, $n_1$ are channel noise at discrete time instances 0 and 1, respectively.

Receiver channel estimation may be performed leading to channel estimates $\hat{h}_0$ and $\hat{h}_1$ where the "hat" is denoting the fact that these are channel estimates only. STTD decoding may e.g. be then expressed by $$+\hat{h}^*_0 y_0 + \hat{h}_1 y^*_1 \approx (|h_0|^2 + |h_1|^2) s_0 \qquad (2)$$

$$-\hat{h}_1 y^*_0 + \hat{h}^*_0 y_1 \approx (|h_0|^2 + |h_1|^2) s_1$$

where equality holds only for perfect channel estimation, i.e. for $\hat{h}_0 = h_0$ and $\hat{h}_1 = h_1$.

Figure 6:
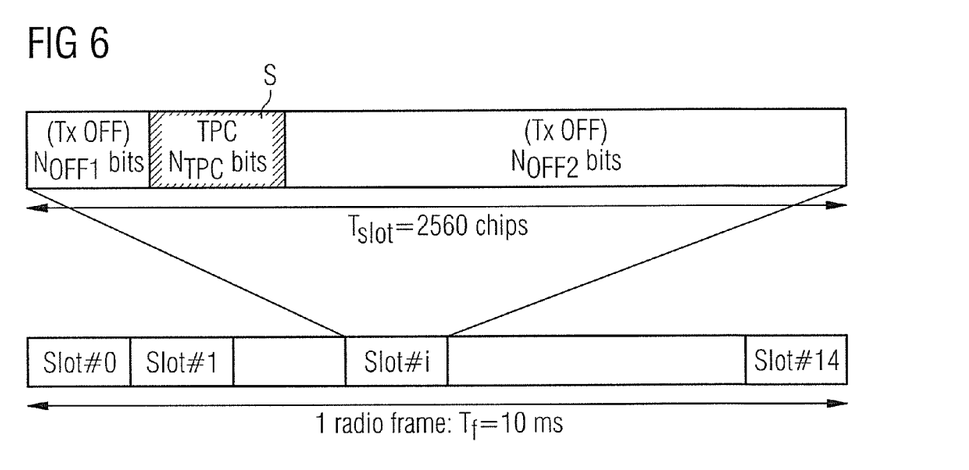
FIG. 6 is a diagram illustrating the frame structure of the F-DPCH in 3GPP UTRAN.
Figure 7:
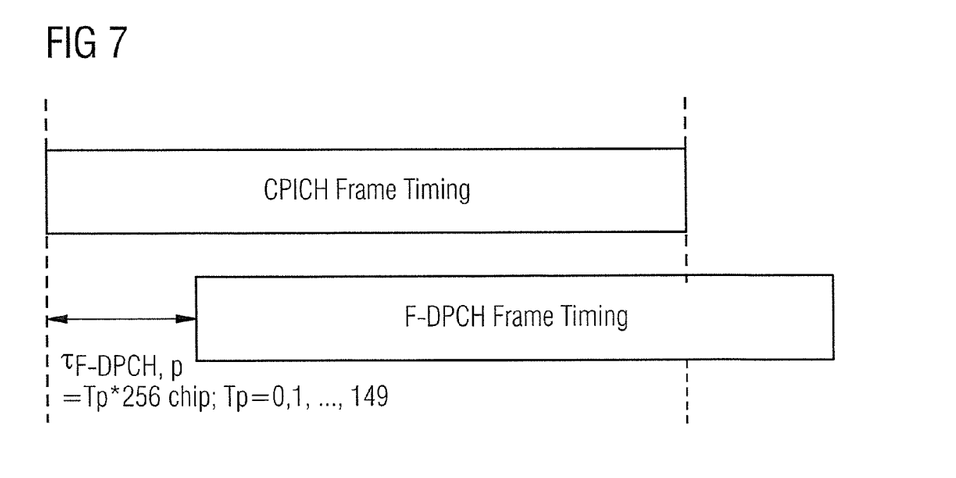
FIG. 7 is a diagram illustrating the CPICH or PCCPCH frame timing.

FIG. 6 (Source 3GPP TS 25.211 Version 7.10.0, Release 7, Section 5.3.2.6 "Fractional Dedicated Physical Channel (F-DPCH)") illustrates a frame structure of F-DPCH as stipulated e.g. in 3GPP TS 25.211 Version 7.10.0, Release 7, Section 5.3.2.6 "Fractional Dedicated Physical Channel (F-DPCH)", the content thereof is incorporated herein by way of reference. The F-DPCH carries TPC commands. Each frame of the F-DPCH has a length of 10 ms and is split into 15 slots, each of length $T_{slot}$=2560 chips. $T_{slot}$ corresponds to one power-control period. The F-DPCH is defined as a spreading factor SF=256 channel including only TPC bits. More specifically, two TPC bits (i.e. $N_{TPC}$=2) define one (QPSK-modulated) TPC symbol s of SF=256. In one slot, F-DPCH contains one TPC symbol s (also referred to as F-DPCH symbol herein). Every NodeB or base station in 3GPP is characterized by a certain frame timing, so called CPICH or PCCPCH frame timing. According to 3GPP TS 25.211 Version 7.10.0, Release 7, Section 7.1, the p-th F-DPCH channel (for the p-th user) may be shifted in time with relation to this CPICH timing by $T_{F-DPCH,p} = T_p \times 256$ chip, $T_p \in \{0, 1, \ldots, 149\}$, see FIG. 7. The value of $T_{DPCH,p}$ is chosen for every user independently in order to satisfy certain network timing conditions.

The TPC symbol s is associated with one specific user, since the F-DPCH is dedicated to one specific user. The position of the TPC symbol s is movable within a slot. As apparent from FIG. 6, there are ten possible positions for the TPC symbol s in the slot. Accordingly, the standard defines ten different slot formats indicated by #i=0.1, ..., 9. Depending on the slot format #i, the TPC symbol s may occupy an interval corresponding to the first 256 chips of the slot ($N_{OFF1}$ bits=0, $N_{OFF2}$ bits=18), the TPC symbol s may occupy an interval corresponding to the second 256 chips of the slot (i.e. $N_{OFF1}$ bits=2, $N_{OFF2}$ bits=16), the TPC symbol s may occupy an interval corresponding to the third 256 chips (i.e. $N_{OFF1}$ bits=4, $N_{OFF2}$ bits=14), ..., and the TPC symbol s may occupy the last 256 chips of the slot (i.e. $N_{OFF1}$ bits=18, $N_{OFF2}$ bits=0).

One F-DPCH channel consuming one orthogonal variable spreading factor (OVSF) code may be time shared to carry the TPC symbols for up to ten users. Depending on the different values of $\Box_{F-DPCH,p}$ for the 10 users, it is possible to assign a F-DPCH slot format to each user such that the 10 users' TPC symbols occupy different non-overlapping fields of size 256 chips as shown e.g. in FIG. 3.

According to 3GPP TS 25.211 Version 7.10.0, only one modulated symbol (e.g. TPC symbol s) is used for a single user. Therefore, it was held that it is not possible to apply known STBC transmit diversity techniques to F-DPCH, since STBC techniques require at least two successive symbols, e.g. operate on pairs of symbols. Therefore, in case of transmit diversity available in the base station, 3GPP defines that the same TPC symbol is transmitted with half the power from both transmit antennas for F-DPCH, see 3GPP TS 25.211 Version 7.10.0, Release 7, Section 5.3.2.1 "STTD for DPCH and F-DPCH", the content of this Section is incorporated herein by way of reference. In the following, the present scheme of transmitting the same TPC symbol with half the power from both transmit antennas will be referred to as "dummy TxDiv".

According to a first aspect of the disclosure, time-shared F-DPCHs of different users may be STTD encoded. Since STTD encoding requires the definition of start and end of pairs of symbols, the CPICH timing of the respective NodeB may be used as a common time basis. The F-DPCH symbols for users with ($\Box_{F-DPCH,p}/256$ chips+$N_{OFF1\ bits}/2$)mod 2=0 may form the first parts of a symbol pair, the other F-DPCH symbols may form the second parts of a symbol pair.

As illustrated in FIG. 4, the TPC symbol of F-DPCH of user 0 may be paired with the TPC symbol of F-DPCH of user 1 to compose a pair of consecutive TPC symbols associated with user 0 and user 1 (i.e. by way of example [U0,U1] as shown in FIG. 3). STTD encoding performed on that pair of TPC symbols may be performed as has been described more generally with reference to FIG. 3. In other words, the illustration of FIG. 3 may represent a time-shared channel of ten F-DPCHs allocated to users U0, U1, ..., U9. Multiplexor 320 of FIG. 4 may be controlled in order to compose pairs of symbols for F-DPCH users 0 to 9 as described above.

By way of example, in HSPA the STTD encoding of F-DPCH may be used for a plurality of scenarios for transmit diversity, e.g.:

1) "TxDiv Cells": The primary CPICH (Common Pilot CHannel) is transmitted with an orthogonal pattern from the two Tx antennas, and all users and all channels in a cell know about and make use of TxDiv, specifically PCPICH (Primary CPICH), SCH (Synchronization CHannel), PCCPCH (Primary Common Control Physical CHannel), AICH (Acquisition Indicator CHannel), PICH (Page Indicator CHannel) and potentially also SCCPCH (Secondary Common Control Physical CHannel), DPCH (Dedicated Physical CHannel), F-DPCH, HS-PDSCH (High Speed Physical Downlink CHannel), HS-SCCH (High Speed Shared Control CHannel for HS-DPCH), E-AGCH (Enhanced Dedicated Channel Absolut Grant CHannel), E-RGCH (Enhanced Dedicated Channel Relative Grant CHannel) and E-HICH (Enhanced Dedicated Channel Hybride ARQ Indicator CHannel). In a "TxDiv Cell" the two Tx antennas are equally loaded if all channels employ TxDiv.

2) "MIMO Cells" (since 3GPP Rel-7): Only HSDPA-MIMO capable UEs are notified about and make use of the presence of two Tx antennas in the base station. Legacy UEs even do not know about the presence of two Tx antennas and operate in "normal" mode. Specifically PCPICH, SCH, PCCPCH, AICH, PICH, SCCPCH channels are transmitted without TxDiv. Only DPCH, FDPCH, HS-PDSCH, HS-SCCH, E-AGCH, E-RGCH and E-HICH, i.e. the HSPA channels, make use of TxDiv when the UE is receiving HSDPA in MIMO mode. In a "MIMO Cell" the two Tx antennas are unsymmetrically loaded since only a part of the multiuser signal is actually transmitted from the second antenna.

Figure 8:
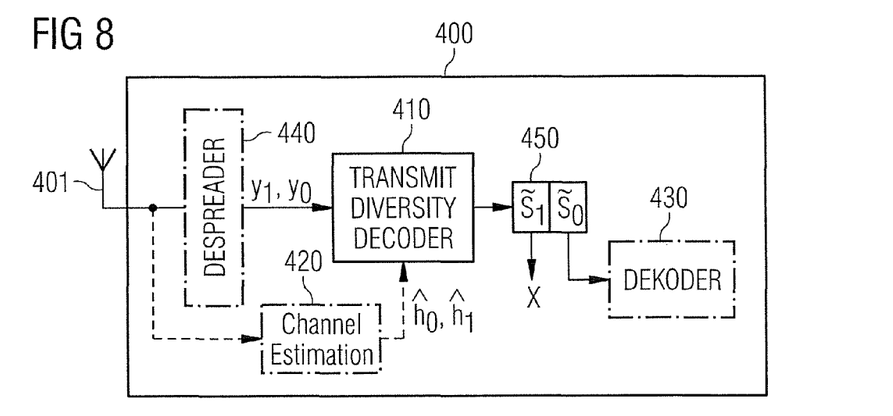
FIG. 8 is a block diagram illustrating an exemplary implementation of a radio receiver apparatus in accordance with the disclosure.

According to FIG. 8, a receiver 400 may include a transmit diversity decoder 410, e.g. a discarding unit 450, e.g. a channel estimator 420 and e.g. a decoder, e.g. a TPC decoder 430. Optionally, the receiver 400 may further comprise despreaders 440 connected between the antenna 401 and the transmit diversity decoder 410. Without loss of generality, receiver 400 may be associated with user 0. Receiver 400 may e.g. form part of one UE 151 or UE 152 of FIG. 1.

Symbols $y_0, y_1$, which may have been generated in accordance with the description to FIG. 5, are received from a receive antenna 401 and are provided to transmit diversity decoder 410 and channel estimator 420. Channel estimator 420 may generate channel estimates $\hat{h}_0, \hat{h}_1$ as e.g. described in conjunction with FIG. 5. Typically, multi-path channel estimates having multiple taps may be generated, which is not further explained herein.

Transmit diversity decoder 410 may generate estimated versions $\tilde{s}_0, \tilde{s}_1$ of the transmitted symbols $s_0, s_1$. These estimated symbols $\tilde{s}_0, \tilde{s}_1$ may be passed to the discarding unit 450. The discarding unit 450 may discard estimated symbol $\tilde{s}_1$, which is dedicated to a different user. Estimated symbol $\tilde{s}_0$ may be processed further, i.e. passed to the channel decoder 430 to obtain the information contained therein. By way of example, if $\tilde{s}_0$ is an estimated TPC symbol, the transmit power command is obtained in the TPC decoder 430 and is made available for further evaluation and control processing.

In case the receiver 400 forms part of an UE 151 which is a non-MIMO UE, only one receive antenna 401 may be provided. The receiver 400 may also form part of a MIMO UE 152. In this case, two or more receive antennas (not depicted in FIG. 8) are provided. By way of example, a MIMO UE 152 may simply comprise two receivers 400. The information contained in the two estimated symbols $\tilde{s}_0$ (e.g. TPC command) may then be generated based on the two estimated symbols $\tilde{s}_0$ generated by the two transmit diversity decoders 410 of the two receivers 400.

In the following the effect of STTD decoding of a pair of symbols, on which STTD encoding has been applied, is considered numerically. First, the conventional case is considered that the pair of symbols ($s_0$ and $s_1$) are related to the same user and therefore have equal transmit powers. The matrix formulation for STTD is $$\begin{bmatrix} y_0 \\ y_1^* \end{bmatrix} = \underbrace{\begin{bmatrix} h_0 & -h_1 \\ h_1^* & h_0^* \end{bmatrix}}_{H} \cdot \begin{bmatrix} s_0 \\ s_1^* \end{bmatrix} + \begin{bmatrix} n_0 \\ n_1^* \end{bmatrix}. \quad (3)$$

STTD decoding in the receiver may be written as $$\begin{bmatrix} \tilde{s}_0 \\ \tilde{s}_1^* \end{bmatrix} = \underbrace{\begin{bmatrix} h_0^* & h_1 \\ -h_1^* & h_0 \end{bmatrix}}_{H^H} \cdot \begin{bmatrix} y_0 \\ y_1^* \end{bmatrix} \quad (4)$$

$$= \underbrace{\begin{bmatrix} h_0^* & h_1 \\ -h_1^* & h_0 \end{bmatrix}}_{H^H} \underbrace{\begin{bmatrix} h_0 & -h_1 \\ h_1^* & h_0^* \end{bmatrix}}_{H} \cdot \begin{bmatrix} s_0 \\ s_1^* \end{bmatrix} + \underbrace{\begin{bmatrix} h_0^* & h_1 \\ -h_1^* & h_0 \end{bmatrix}}_{H^H} \begin{bmatrix} n_0 \\ n_1^* \end{bmatrix}$$

$$= \underbrace{\begin{bmatrix} |h_0|^2 + |h_1|^2 & 0 \\ 0 & |h_0|^2 + |h_1|^2 \end{bmatrix}}_{H} \cdot \begin{bmatrix} s_0 \\ s_1^* \end{bmatrix} + \begin{bmatrix} n_0' \\ n_1'^* \end{bmatrix}$$

$$= (|h_0|^2 + |h_1|^2) \cdot \begin{bmatrix} s_0 \\ s_1^* \end{bmatrix} + \begin{bmatrix} n_0' \\ n_1'^* \end{bmatrix}.$$

The diversity gain achieved via STTD coding is expressed by the useful signal contribution ($|h_0|^2 + |h_1|^2$) which is now a chi-squared distributed with four degrees of freedom which represents the diversity gain from STTD coding (or Alamouti coding since STTD coding uses an Alamouti code of length 2).

In the following, STTD coding of two symbols $s_0$ and $s_1$ for two different users with different relative transmit powers $(w_{D0})^2$ and $(w_{D1})^2$ is considered. The symbols $s_0$ and $s_1$ may e.g. be TPC symbols. The matrix formulation for STTD coding is $$\begin{bmatrix} y_0 \\ y_1^* \end{bmatrix} = \underbrace{\begin{bmatrix} h_0 & -h_1 \\ h_1^* & h_0^* \end{bmatrix}}_{H} \cdot \begin{bmatrix} w_{D0} s_0 \\ w_{D1} s_1^* \end{bmatrix} + \begin{bmatrix} n_0 \\ n_1^* \end{bmatrix}; \quad (5)$$

$$E\{\|w_{D0} s_0\|^2\} = (w_{D0})^2; \; E\{\|w_{D1} s_1\|^2\} = (w_{D1})^2$$

$$\frac{(w_{D1})^2}{(w_{D0})^2} = K \gg 1$$

where $E\{\cdot\}$ is the expectation value of the argument.

STTD decoding may be expressed by $$w_C \begin{bmatrix} w_{D0} \tilde{s}_0 \\ w_{D1} \tilde{s}_1^* \end{bmatrix} = \underbrace{\begin{bmatrix} \hat{h}_0^* & \hat{h}_1 \\ -\hat{h}_1^* & \hat{h}_0 \end{bmatrix}}_{\hat{H}^H} \cdot \begin{bmatrix} y_0 \\ y_1^* \end{bmatrix} \quad (6)$$

$$= \underbrace{\begin{bmatrix} w_C h_0^* + m_0^* & w_C h_1 + m_1 \\ -w_C h_1^* - m_1^* & w_C h_0 + m_0 \end{bmatrix}}_{\hat{H}^H} \cdot \begin{bmatrix} y_0 \\ y_1^* \end{bmatrix}$$

$$= w_C \underbrace{\begin{bmatrix} h_0^* & h_1 \\ -h_1^* & h_0 \end{bmatrix}}_{H^H} \cdot \begin{bmatrix} y_0 \\ y_1^* \end{bmatrix} + \begin{bmatrix} m_0^* & m_1 \\ -m_1^* & m_0 \end{bmatrix} \cdot \begin{bmatrix} y_0 \\ y_1^* \end{bmatrix}$$

$$= w_C \underbrace{\begin{bmatrix} h_0^* & h_1 \\ -h_1^* & h_0 \end{bmatrix}}_{H^H} \underbrace{\begin{bmatrix} h_0 & -h_1 \\ h_1^* & h_0^* \end{bmatrix}}_{H} \cdot \begin{bmatrix} w_{D0} s_0 \\ w_{D1} s_1^* \end{bmatrix} +$$

$$w_C \underbrace{\begin{bmatrix} h_0^* & h_1 \\ -h_1^* & h_0 \end{bmatrix}}_{H^H} \cdot \begin{bmatrix} n_0 \\ n_1^* \end{bmatrix} + \begin{bmatrix} m_0^* & m_1 \\ -m_1^* & m_0 \end{bmatrix}.$$

$$\begin{bmatrix} h_0 & -h_1 \\ h_1^* & h_0^* \end{bmatrix} \cdot \begin{bmatrix} w_{D0} s_0 \\ w_{D1} s_1^* \end{bmatrix} + \begin{bmatrix} m_0^* & m_1 \\ -m_1^* & m_0 \end{bmatrix} \cdot \begin{bmatrix} n_0 \\ n_1^* \end{bmatrix}$$

$$= w_C \underbrace{\begin{bmatrix} |h_0|^2 + |h_1|^2 & 0 \\ 0 & |h_0|^2 + |h_1|^2 \end{bmatrix}}_{H} \cdot \begin{bmatrix} w_{D0} s_0 \\ w_{D1} s_1^* \end{bmatrix} +$$

$$\begin{bmatrix} n_0' \\ n_1'^* \end{bmatrix} + \begin{bmatrix} m_0^* & m_1 \\ -m_1^* & m_0 \end{bmatrix}.$$

$$\begin{bmatrix} h_0 w_{D0} s_0 - h_1 w_{D1} s_1^* \\ h_1^* w_{D0} s_0 + h_0^* w_{D1} s_1^* \end{bmatrix} + \begin{bmatrix} n_0'' \\ n_1''^* \end{bmatrix}$$

$$\approx w_C(|h_0|^2 + |h_1|^2) \cdot \begin{bmatrix} w_{D0} s_0 \\ w_{D1} s_1^* \end{bmatrix} + \begin{bmatrix} n_0' \\ n_1'^* \end{bmatrix} +$$

$$\begin{bmatrix} m_0^* & m_1 \\ -m_1^* & m_0 \end{bmatrix} \cdot \begin{bmatrix} h_0 w_{D0} s_0 - h_1 w_{D1} s_1^* \\ h_1^* w_{D0} s_0 + h_0^* w_{D1} s_1^* \end{bmatrix}$$

where $m_0$ is the channel estimation error of $\hat{h}_0$ and $m_1$ is the channel estimation error of $\hat{h}_1$. The channel estimation is usually performed on the CPICH channel which is transmitted with relative power $(w_C)^2$.

As it is apparent from equation (6) STTD encoded symbols of different users can be recovered perfectly (i.e. with diversity gain), but the user with the smaller transmit power (here, by way of example the user U0 associated with symbol $s_0$) suffers from channel estimation noise. With $$\sigma_n^2 = E\{\|n_0\|^2\} = E\{\|n_1\|^2\} \quad (7)$$

$$\sigma_c^2 = E\{\|m_0\|^2\} = E\{\|m_0\|^2\} = \frac{\sigma_n^2}{M}$$

the variance of the channel estimates is smaller by a factor M than the variance of the signal itself, which is due to the gain associated with the channel estimation. The signal energy $S_{s_0}$ and the noise and interference energy $N_{s_0}$ of the symbol $s_0$ having the smaller transmit power may be expressed by $$S_{s_0} = (w_C)^2 (w_{D0})^2 (\|h_0\|^2 + \|h_1\|^2)^2 \quad (8)$$

$$N_{s_0} = (w_C)^2 (\|h_0\|^2 + \|h_1\|^2) \cdot \sigma_n^2 + (\|h_0\|^2 + \|h_1\|^2) \cdot$$

$$((w_{D0})^2 + (w_{D1})^2) \sigma_c^2$$

$$= (\|h_0\|^2 + \|h_1\|^2) \cdot \sigma_n^2 \cdot (w_C)^2 \cdot \left[ 1 + \frac{(w_{D0})^2}{(w_C)^2} \cdot \frac{(1+K)}{M} \right]$$

Conventionally, when the symbol pair $s_0$, $s_1$ would be associated with the same user, K=1. Since the variance of the channel estimates is much smaller than the noise and interference variance of the signal, i.e. M≫1, and since the transmit power for the CPICH channel $(w_C)^2$ is usually larger than the transmit power for the F-DPCH channel $(w_D)^2$, the first term in equation (8) dominates. However, two different users may receive rather different channel transmit powers, i.e. K≫1. In this case the contribution of the noise energy related to the variance of the channel estimates in equation (8) scales with a factor of (1+K) and therefore, this contribution may significantly increase.

Nevertheless, according to simulation results, the beneficial effect of obtaining STTD diversity gain may clearly overcompensate the adverse effect of channel estimation noise introduced by different transmit powers of the users. By way of example, with channel estimation noise having 10 dB less power than the "normal" channel noise and interference, the channel estimation noise contribution has the same variance as the "normal" noise and interference for K=10. Thus the degradation relative to the case of transmit diversity encoded symbols of equal power is fairly limited.

Figure 9:
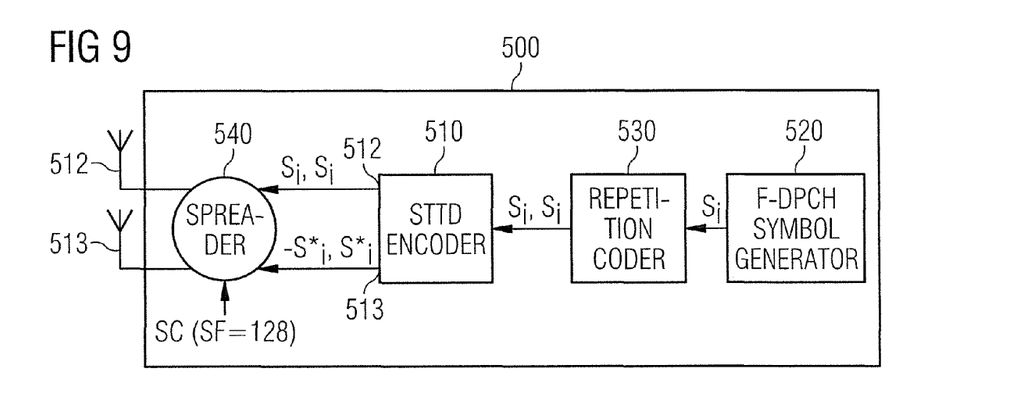
FIG. 9 is a block diagram illustrating an exemplary implementation of a radio transmitter apparatus in accordance with the disclosure.

FIG. 9 illustrates by way of example a transmitter 500 according to a second approach to transmit F-DPCH symbols with TxDiv. The transmitter 500 may form part of an UTRAN (UMTS Terrestrial Radio Access Network) as defined e.g. in 3GPP Technical Specification 25.211, Version 7.10.0. By way of example, the transmitter 500 may be located in a base station thereof.

The transmitter 500 may comprise a F-DPCH symbol generator 520 configured to generate symbols $s_i$ of the F-DPCH dedicated to one specific user (i.e. the user U0 under consideration). Further, transmitter 500 may include a repetition coder 530, a STTD encoder 510 and a spreader 540.

One symbol $s_i$ per time slot is generated by the F-DPCH symbol generator 520 in accordance with FIG. 6. Here, the lowercase index i relates to the time slot number. The repetition coder 530 may duplicate the symbol $s_i$. That is, the repetition coder 530 may generate a copy of symbol $s_i$ and outputs this copy together with the received symbol $s_i$. As a result, symbol pair $(s_i, s_i)$ may be output by repetition coder 530.

STTD encoder 510 applies STTD encoding (i.e. Alamouti's code) to the symbol pair $(s_i, s_i)$ as defined in the above-cited 3GPP Standard. That is, STTD encoder 510 may be similar to STTD encoders 210 and 310 described above. Since symbol $s_i$ has been transformed into a symbol pair $(s_i, s_i)$ by repetition coder 530, there are two modulated (e.g. QPSK-modulated) F-DPCH symbols for user U0 (per time slot) which can nicely be STTD encoded.

According to FIG. 5, symbol pairs $s_i, s_i$ and $-s^*_i, s^*_i$ are output at outputs 512 and 513 of STTD encoder 510, respectively. In spreader 540 these symbols are spread by a spreading code of SF=128. Since the regular SF=256 spreading of F-DPCH has been reduced to SF=128 and the F-DPCH symbol $s_i$ has been duplicated, the slot format of F-DPCH, as illustrated in FIG. 6, can be kept without modification. As mentioned before, spreading with SF=128 involves up-sampling by the spreading factor SF and convolving the up-sampled symbols $s_i$ with an OVSF code.

The spread symbols may than be scrambled, combined and modulated before being transmitted via antennas 512, 513.

Figure 10:
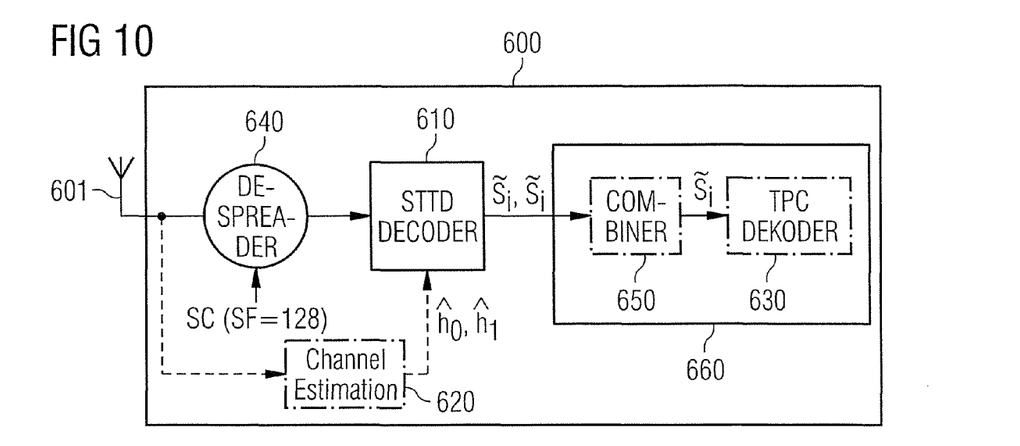
FIG. 10 is a block diagram illustrating an exemplary implementation of a radio receiver apparatus in accordance with the disclosure.

FIG. 10 illustrates by way of example a block diagram of a receiver 600 configured to receive a F-DPCH signal generated, e.g., by transmitter 500 of FIG. 9. The receiver 600 may include a despreader 640, a STTD decoder 610, an evaluation unit 660, e.g. a combiner 650, e.g. a channel estimator 620 and e.g. a TPC decoder 630. As the receiver 600 may be adapted to receive the F-DPCH as formed by transmitter 500, symbols $y_0, y_1$ which may have been generated in accordance with the description of FIG. 5 based on a transmitted symbol pair $s_i, s_i$ may be received from a receive antenna 601. The received symbols $y_0, y_1$ are despread by despreader 640 using the same spreading code (e.g. SF=128) as applied in the transmitter 500. The despread symbols may be provided to STTD decoder 610. The STTD decoder 610 generates estimated versions $\tilde{s}_i, \tilde{s}_i$ of the transmitted symbols $s_i, s_i$. STTD decoding may be based on channel estimates $\hat{h}_0, \hat{h}_1$ as described above.

These estimated versions $\tilde{s}_i, \tilde{s}_i$ of the transmitted symbols $s_i, s_i$ are then evaluated in evaluation unit 660 to obtain the transmit power control information carried by them. By way of example, the evaluation unit 660 may comprise a combiner 650 configured to receive the estimated symbol pair $\tilde{s}_i, \tilde{s}_i$ and to reduce the symbol pair to one symbol $\tilde{s}_i$. Reduction of the symbol pair $\tilde{s}_i, \tilde{s}_i$ to one symbol $\tilde{s}_i$ may be accomplished by combining the two symbols of the symbol pair, since the symbols contain identical or redundant information due to repetition coder 530. It is also possible to simply take one of the two symbols $\tilde{s}_i, \tilde{s}_i$ and to discard the other. Estimated symbol $\tilde{s}_i$ at the output of the combiner 650 may represent the estimated TPC symbol of the F-DPCH in slot i dedicated to the user under consideration (e.g. user U0 using the UE in which receiver 600 is implemented). The TPC decoder 630 may then be used to extract the transmit power control command from the estimated F-DPCH symbol $\tilde{s}_i$.

As mentioned before, conventional F-DPCH transmission according to 3GPP involves the transmission of an F-DPCH symbol with half the power from both antennas without STTD encoding ("dummy TxDiv"—scheme (a)). Another F-DPCH transmission scheme is to use only one single transmit antenna for transmitting the single F-DPCH symbol, i.e. to transmit the F-DPCH symbol with no TxDiv (scheme (b)). The two approaches outlined above according to this disclosure both use STTD encoding, either by keeping to SF=256 and the slot format of F-DPCH, but by performing STTD encoding for two adjacent modulated TPC symbols for two different users (scheme (c)—see also disclosure to FIGS. 1 to 8), or by reducing the SF=256 to SF=128 to obtain two modulated TPC symbols during one conventional TPC symbol period according to 3GPP and by keeping the slot format of F-DPCH (scheme (d)—see also disclosure to FIGS. 1, 5, 6, 9 and 10).

In accordance with the disclosure, it may be possible to change the F-DPCH transmission scheme from one of the above-mentioned four schemes to another of the above-mentioned four schemes. This change or switching over of F-DPCH transmission schemes may be handled via physical layer reconfiguration as, e.g., used normally in 3GPP (e.g. for DPCH). Thus, scheme switching may be decided, accomplished and signaled to the UEs by the network.

Figure 11:
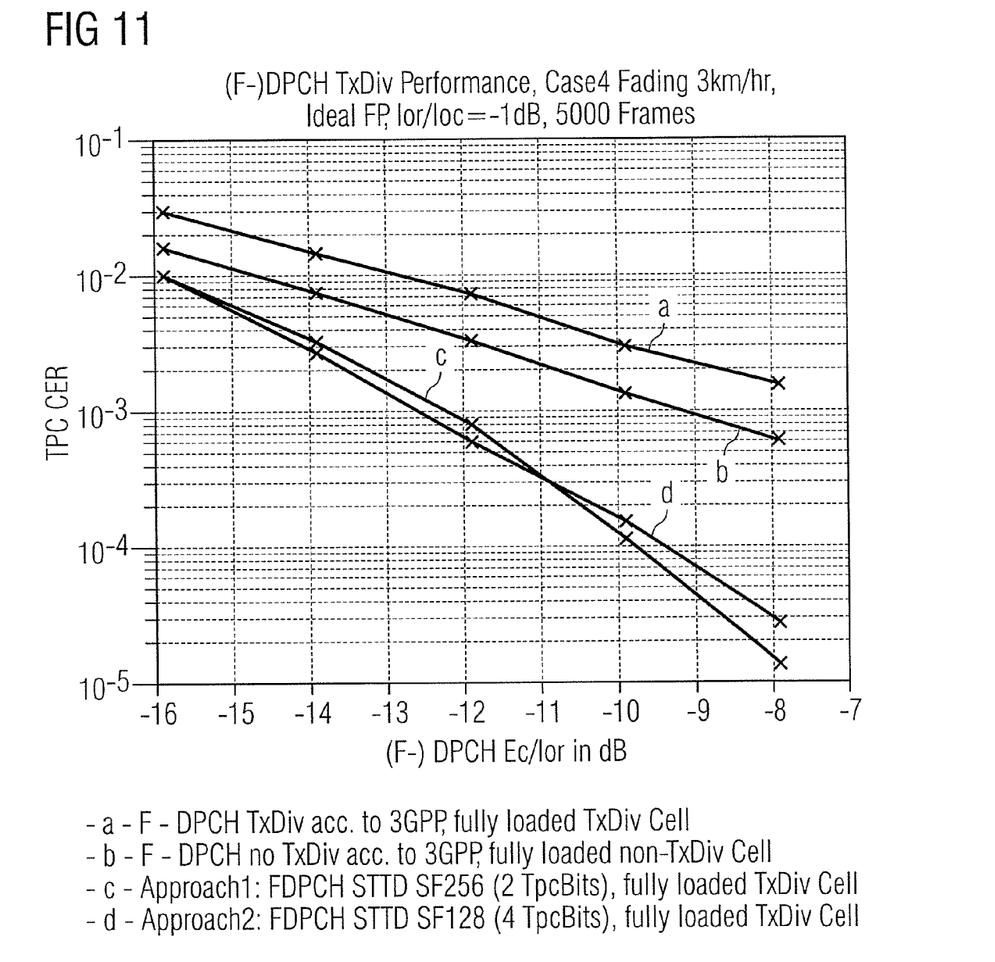
FIG. 11 is a graph illustrating simulation results of a TPC command error rate versus Ec/Ior.

FIG. 11 is a graph illustrating simulation results of a TPC command error rate (TPC CER) versus Ec/Ior in dB. Ec/Ior is the ratio in units of dB between the energy accumulated over one chip period (Ec) to the total transmit power spectral density (Ior). FIG. 11 illustrates the performance of F-DPCH STTD encoding according to scheme (c) and scheme (d) in comparison with F-DPCH transmission according to the conventional TxDiv transmission according to 3GPP (scheme (a)) and the non-TxDiv transmission scheme (b). As may be seen from FIG. 11, there is a strong performance degradation (2 dB) when switching from a fully loaded non-TxDiv cell to a fully loaded TxDiv cell for F-DPCH. This degradation also occurs in MIMO cells where a part of the UEs are MIMO-UEs and another part of the UEs are non-MIMO UEs. As it is apparent from FIG. 11, the conventional F-DPCH "dummy" TxDiv scheme (b) as stipulated in 3GPP—i.e. transmitting the same signal with half the power from both transmit antennas—not only does not provide any diversity gain, but is very sensitive to interference from the other channels transmitted by the base station from both transmit antennas. Simply transmitting F-DPCH only from one transmit antenna improves the performance but does not solve the problem. Clearly, the F-DPCH transmission schemes (c) and (d) disclosed herein and addressed in FIG. 11 as Approach 1 and Approach 2, respectively, show significantly improved performance due to the full exploitation of diversity gain. The simulation has been done over 5000 F-DPCH frames using fading conditions of Ior/Ioc=−1 dB, velocity=3 km/hr and a TxDiv cell (no MIMO cell). Ioc is the power spectral density of band-limited white noise. Ior/Ioc is also referred to as geometry factor G in the art. As to Approach 1 (i.e. scheme (c)), even in the case of a strong neighbor user, it has been found that performance is significantly improved at least in low-velocity environments.

From the above and further simulations it appears that for both Approaches (i.e. schemes (c) and (d)) gains with minimum 2 dB and up to 4 dB or more can be achieved in all scenarios for realistic conditions.

Figure 12:
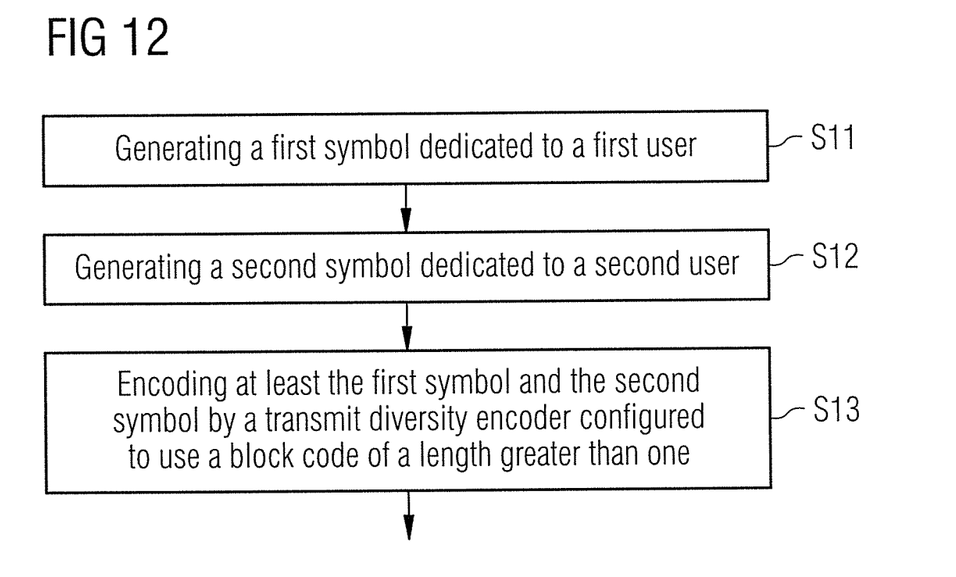
FIG. 12 is a flow chart illustrating an exemplary method of encoding symbols by a transmit diversity encoder in accordance with the disclosure.

FIG. 12 illustrates one exemplary method in accordance with the disclosure. In step S11, a first symbol dedicated to a first user is generated.

In step S12, a second symbol dedicated to a second user is generated.

In step S13, at least the first symbol and the second symbol are encoded by a transmit diversity encoder configured to use a block code of a length greater than one.

Figure 13:
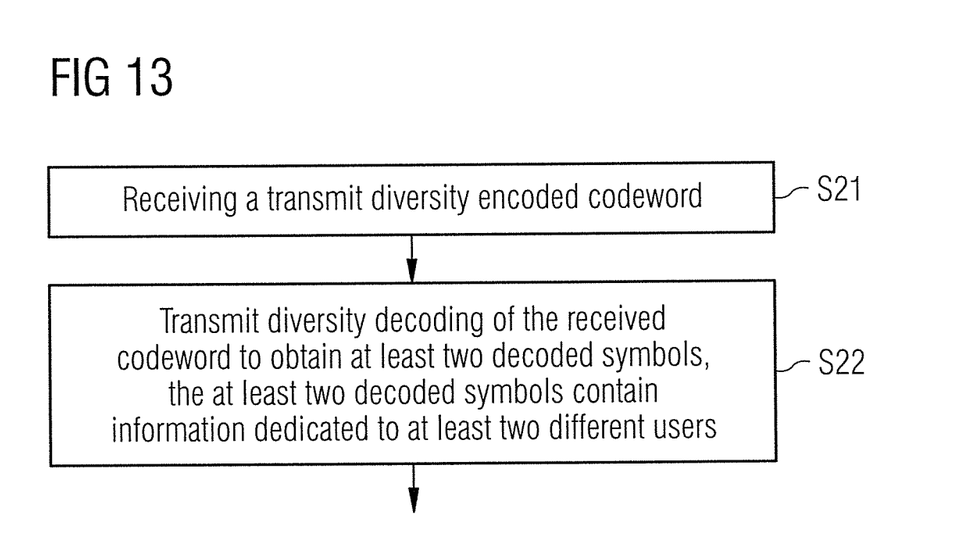
FIG. 13 is a flow chart illustrating an exemplary method of decoding symbols encoded by a transmit diversity encoder in accordance with the disclosure.

According to FIG. 13 an exemplary method in accordance with the disclosure may comprise the step S21 of receiving a transmit diversity encoded codeword.

In step S22, the received codeword is transmit diversity decoded to obtain at least two decoded symbols, the at least two decoded symbols contain information dedicated to at least two different users.

Figure 14:
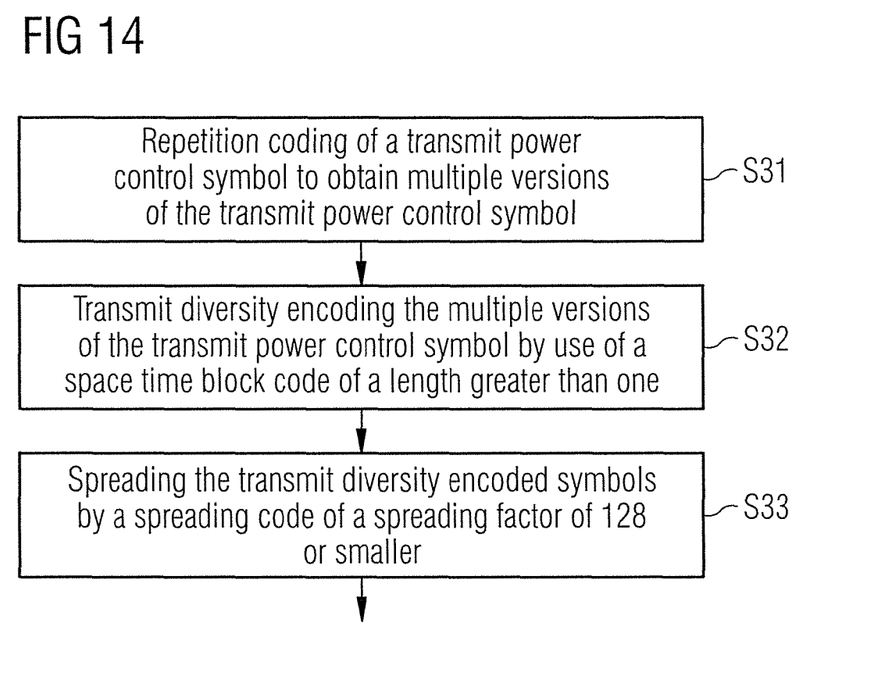
FIG. 14 is a flow chart illustrating an exemplary method of encoding transmit power control symbols by a transmit diversity encoder in accordance with the disclosure.

FIG. 14 illustrates one further exemplary method in accordance with the disclosure. In step S31, a transmit power control symbol is repetition-encoded to obtain multiple versions of the transmit power control symbol.

In step S32, the multiple versions of the transmit power control symbol are transmit diversity encoded by use of a space time block code of a length greater than one.

In step S33, the transmit diversity encoded symbols are spread by a spreading code of a spreading factor of 128 or smaller.

Figure 15:
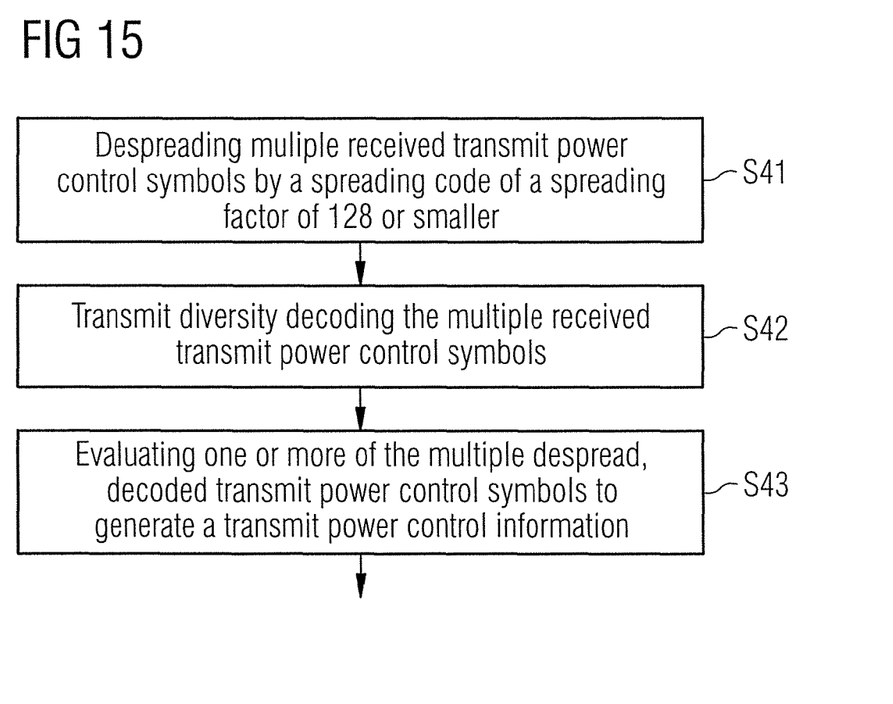
FIG. 15 is a flow chart illustrating an exemplary method of decoding transmit power control symbols encoded by a transmit diversity encoder in accordance with the disclosure.

According to FIG. 15 in step S41, multiple received transmit power control symbols are despread by a spreading code of a spreading factor of 128 or smaller.

In step S42, the multiple received transmit power control symbols are transmit diversity decoded.

In step S43, one or more of the multiple despread, decoded transmit power control symbols are evaluated to generate a transmit power control information.

It is to be noted that the implementations and methods described above are applicable to various standards and transmit diversity techniques, amongst them STTD, TSTD, CLTD, SFTD and MIMO. By way of example, in LTE transmitters and receivers, the concept of transmit diversity encoding and decoding of symbols dedicated to different users is also applicable.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of embodiments described herein. Therefore, it is intended that this invention is limited only by the claims and the equivalents thereof.

What is claimed is:

1. A transmitter apparatus, comprising:
   a combiner configured to combine a first symbol dedicated to a first user and a second symbol dedicated to a second user to form a block code of a length greater than one having at least two consecutive complex symbols;
   a space time transmit diversity encoder configured to use the block code of a length greater than one for space time encoding the at least two consecutive complex symbols, and
   wherein the first symbol and the second symbol are transmit power control symbols.

2. The transmitter apparatus of claim 1, further comprising:
   at least two transmit antenna ports configured to couple to two transmit antennas, respectively, coupled to an output of the transmit diversity encoder.

3. The transmitter apparatus of claim 1, wherein the block code has a length of only 2 symbols.

4. The transmitter apparatus of claim 1, wherein the block code is a space time block code.

5. The transmitter apparatus of claim 1, wherein the block code is a space frequency block code.

6. The transmitter apparatus of claim 1, wherein the block code is Alamouti's code.

7. The transmitter apparatus of claim 1, wherein the transmitter is a High Speed Packet Access (HSPA) transmitter.

8. The transmitter apparatus of claim 1, wherein the transmitter is a Long Term Evolution (LTE) transmitter.

9. The transmitter apparatus of claim 1, wherein the block code is configured to encode two consecutive symbols.

10. The transmitter apparatus of claim 1, wherein the first symbol is a symbol of a Fractional Dedicated Physical Channel (F-DPCH) dedicated to the first user and the second symbol is a symbol of a F-DPCH dedicated to the second user.

11. The transmitter apparatus of claim 1, wherein the transmitter apparatus is part of a base station of a cellular radio network.

12. A method, comprising:
   generating a first symbol dedicated to a first user;
   generating a second symbol dedicated to a second user;
   combining the first symbol and the second symbol to form a block code of a length greater than one by a multiplexor; and
   space time encoding at least the first symbol and the second symbol by a space time transmit diversity encoder configured to use the block code of a length greater than one, wherein the first symbol and the second symbol are transmit power control symbols.

13. The method of claim 12, further comprising:
   transmitting the at least two encoded symbols via at least two transmit antennas.

14. The method of claim 12, wherein the first symbol is a symbol of a Fractional Dedicated Physical Channel (F-DPCH) dedicated to the first user and the second symbol is a symbol of a F-DPCH dedicated to the second user.

* * * * *